US012416140B2

(12) United States Patent
DePasquale (10) Patent No.: US 12,416,140 B2
(45) Date of Patent: Sep. 16, 2025

(54) ON-DEMAND COLD WATER SHOWERHEAD SYSTEM (71) Applicant: David M DePasquale, Charlotte, NC (US)

(72) Inventor: David M DePasquale, Charlotte, NC (US)

(*) Notice: Subject to any disclaimer, the term of this patent is extended or adjusted under 35 U.S.C. 154(b) by 122 days.

(21) Appl. No.: 18/512,992

(22) Filed: Nov. 17, 2023

(65) Prior Publication Data

US 2024/0167256 A1 May 23, 2024

Related U.S. Application Data (60) Provisional application No. 63/426,305, filed on Nov. 17, 2022.

(51) Int. Cl.
*E03C 1/044* (2006.01)
*E03C 1/04* (2006.01)
*F16K 11/00* (2006.01)

(52) U.S. Cl.
CPC ........... *E03C 1/044* (2013.01); *E03C 1/0408* (2013.01); *F16K 19/006* (2013.01)

(58) Field of Classification Search
CPC ....... E03C 1/044; E03C 1/0408; F16K 19/006
USPC ...................................................... 4/677, 678
See application file for complete search history.

(56) References Cited

U.S. PATENT DOCUMENTS

| | | | | |
|---|---|---|---|---|
| 3,230,735 A * | 1/1966 | Nelson | ................. | F25D 31/002 62/425 |
| 3,865,276 A * | 2/1975 | Thompson | ........... | B67D 1/0857 222/400.7 |
| 4,204,613 A * | 5/1980 | Terzian | ................ | B67D 3/0009 165/169 |
| 4,274,557 A * | 6/1981 | Shannon | .............. | B67D 1/1234 222/145.8 |
| 4,323,173 A * | 4/1982 | Shannon | .............. | B67D 1/1234 222/145.8 |
| 4,398,830 A * | 8/1983 | Koerfer | ................. | A47J 43/128 165/47 |
| 5,331,694 A * | 7/1994 | Mackenzie | ............ | A47K 3/286 239/128 |
| 6,929,002 B1* | 8/2005 | Adrian | ...................... | F24H 1/06 220/521 |
| 7,028,922 B2* | 4/2006 | Leonard | .................. | E03C 1/046 137/4 |

(Continued)

FOREIGN PATENT DOCUMENTS

CN 118273426 A * 7/2024 ............... E03C 1/02
EP 2937760 A1 * 10/2015 ............ E03B 7/075

*Primary Examiner* — Lori L Baker
(74) *Attorney, Agent, or Firm* — Dunlap Bennett & Ludwig, PLLC; Anna L. Kinney (57) ABSTRACT

A showerhead system includes a first connector, a second connector, an ice chamber and a valve. The first connector receives water from an inlet water source. The second connector is connected to a showerhead. The ice chamber receives water from the first connector. The ice chamber stores ice. The valve moves between a first position and a second position. When the valve is in the first position, water flows from the first connector into the ice chamber and the second connector receives the water via the ice chamber. When the valve is in the second position, water flows from the first connector directly to the second connector.

10 Claims, 7 Drawing Sheets

(56) References Cited

U.S. PATENT DOCUMENTS

| | | | | |
|---|---|---|---|---|
| 7,061,133 B1* | 6/2006 | Leijon | | H02K 3/40 |
| | | | | 174/DIG. 15 |
| 7,707,665 B1* | 5/2010 | Hong | | E03B 1/048 |
| | | | | 4/597 |
| 8,156,579 B2* | 4/2012 | Renfrew | | F16L 9/19 |
| | | | | 4/615 |
| 8,789,726 B2* | 7/2014 | Segers | | B67D 1/07 |
| | | | | 222/400.7 |
| 8,876,012 B2* | 11/2014 | McMurtry | | E03B 1/048 |
| | | | | 236/12.13 |
| 9,027,792 B2* | 5/2015 | Watts | | B67D 1/0412 |
| | | | | 222/108 |
| 10,449,559 B2* | 10/2019 | Huang | | E03C 1/0409 |
| 10,568,466 B2* | 2/2020 | Hawkins | | A47K 3/28 |
| 10,767,898 B2* | 9/2020 | Kuo | | F24H 9/146 |
| 11,382,465 B1* | 7/2022 | Lyness | | F24H 15/223 |
| 11,608,559 B2* | 3/2023 | Batzer | | H01L 21/68735 |
| 11,614,236 B2* | 3/2023 | Svartström | | F24H 1/06 |
| | | | | 126/9 R |
| 11,668,080 B2* | 6/2023 | Searcy | | G01K 11/12 |
| | | | | 4/603 |
| 11,978,510 B2* | 5/2024 | Hsieh | | H10N 70/063 |
| 12,042,101 B2* | 7/2024 | Yoo | | B01D 39/1623 |
| 12,116,669 B2* | 10/2024 | Batzer | | H01J 37/32743 |
| 2003/0226200 A1* | 12/2003 | Charonis | | E03C 1/0408 |
| | | | | 4/601 |
| 2005/0127211 A1* | 6/2005 | Yeiser | | B05B 15/628 |
| | | | | 239/436 |
| 2009/0045268 A1* | 2/2009 | Selander | | B05B 12/126 |
| | | | | 239/310 |
| 2010/0018588 A1* | 1/2010 | Lee | | E03C 1/0408 |
| | | | | 4/612 |
| 2010/0193610 A1* | 8/2010 | Leber | | B05B 15/654 |
| | | | | 239/443 |
| 2011/0107513 A1* | 5/2011 | Tjia | | E03C 1/046 |
| | | | | 239/315 |
| 2012/0048968 A1* | 3/2012 | Williams | | E03C 1/0409 |
| | | | | 239/443 |
| 2012/0225564 A1* | 9/2012 | Adachi | | C23C 16/301 |
| | | | | 118/724 |
| 2014/0373268 A1* | 12/2014 | Sherman | | A47K 3/285 |
| | | | | 4/612 |
| 2018/0128533 A1* | 5/2018 | Atalla | | F04D 3/00 |
| 2019/0022671 A1* | 1/2019 | Jack | | B05B 1/18 |
| 2019/0168238 A1* | 6/2019 | Swanson | | B05B 1/18 |
| 2020/0146512 A1* | 5/2020 | Hawkins | | A47K 3/28 |
| 2021/0016301 A1* | 1/2021 | Cipriani | | B05B 1/185 |
| 2022/0093361 A1* | 3/2022 | Wakabayashi | | H01J 37/3244 |
| 2023/0366180 A1* | 11/2023 | Kipp | | E03C 1/0408 |
| 2024/0167256 A1* | 5/2024 | DePasquale | | F16K 19/006 |
| 2024/0226923 A1* | 7/2024 | Rosko | | B05B 15/62 |

* cited by examiner

ON-DEMAND COLD WATER SHOWERHEAD SYSTEM

BACKGROUND OF THE INVENTION

Field of the Invention

The present invention generally relates to a showerhead system, and more particularly to a shower system including an ice chamber configured to provide cold water.

Description of the Related Art

It is known that cold water exposure is beneficial and healthy for users. Many users desire to have cold water showers or ice baths; however, availability of such showers is limited. A typical water feedline from utility water source to a showerhead does not have cold enough water to offer benefits from the practice of cold water exposure.

Further, ice baths or refrigerated circulating baths require expensive infrastructure, and have high upfront and upkeep costs. Due to this, such baths are typically inaccessible or unavailable to most users. Further, such baths utilize substantial energy, space, and resources.

Therefore, there is a need for a system that enables users to conveniently have cold water showers on demand.

SUMMARY OF THE INVENTION

The following presents a simplified summary of the present disclosure in a simplified form as a prelude to the more detailed description that is presented herein.

In accordance with embodiments of the invention, there is provided a showerhead system including a first connector, a second connector, an ice chamber and a valve. The first connector may be configured to receive water from an inlet water source. The second connector may be configured to connect to a showerhead. The ice chamber may be configured to receive water from the first connector. The ice chamber may store ice. Further, the valve may be configured to move between a first position and a second position. In some aspects, the valve enables a flow of water from the first connector into the ice chamber when the valve is in the first position. The second connector may be configured to receive the flow of water via the ice chamber when the valve is in the first position. Further, the valve enables the flow of water from the first connector directly to the second connector when the valve is in the second position.

In additional aspects, the showerhead system may include a third connector and a fourth connector. The third connector may be connected to the first connector, the ice chamber and the fourth connector. Further, the fourth connector may be connected to the second connector. In some aspects, the third connector may be configured to transfer water from the first connector to the ice chamber when the valve may be in the first position, and to the fourth connector when the valve may be in the second position. Furthermore, the fourth connector may be configured to transfer water from the first connector to the second connector.

In some aspects, the valve may be part of the third connector. In further aspects, the showerhead system may include a cap connected to the third connector and the fourth connector. The cap may include an attachment mechanism, e.g., threaded interior portion, and the ice chamber may be attached to the cap via the attachment mechanism.

The present disclosure discloses a showerhead system that allows a larger population access to cold water exposure by minimizing upfront costs, eliminating repeating costs, minimizing upkeep labor, and minimizing spatial requirements. The showerhead system passes feed water through an ice chamber before entering a showerhead. When water passes over the ice or frozen ice pack within the ice chamber, thermal energy is transferred from the feed water to the cold sink (ice or ice pack). The colder water is then routed to the showerhead, and this allows for colder showers. The ice chamber is easy to replenish, and hence the showerhead system is convenient for the user to use. The showerhead system expands the availability of cold water exposure to anyone with a showerhead and a freezer.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION OF INVENTION

For a further understanding of the nature and function of the embodiments, reference should be made to the following detailed description. Detailed descriptions of the embodiments are provided herein, as well as the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

Dimensions disclosed herein are not intended to be limiting. For example, the values disclosed herein may be provided in inches. However, the components may have standardized metric measurements for the installation region that are not exactly the same as the dimensions herein disclosed.

Figure 1:
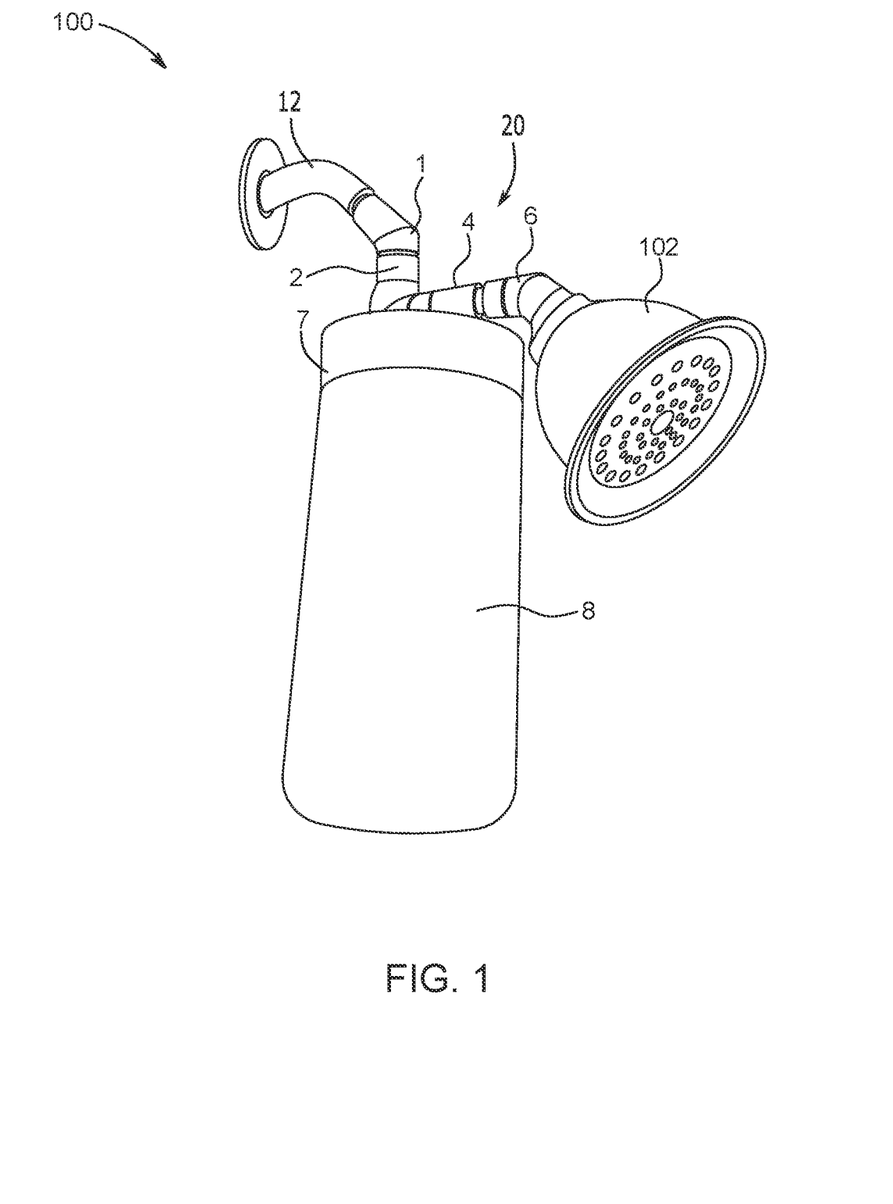
FIG. 1 is a perspective view of an example showerhead system in accordance with embodiments of the present invention, shown connected to a showerhead.
Figure 2:
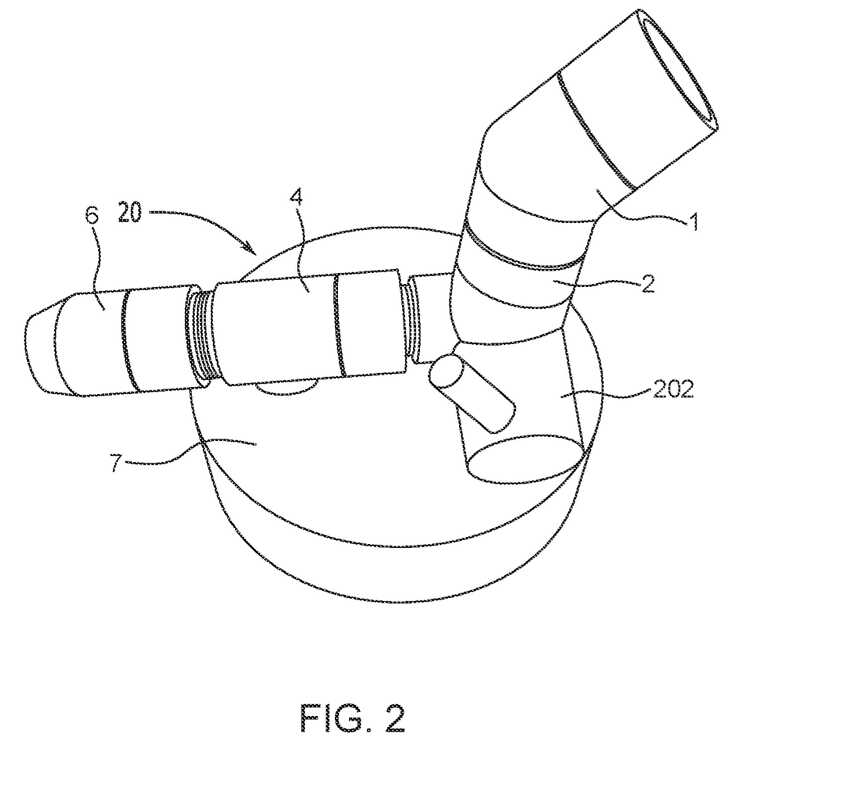
FIG. 2 is a top perspective view thereof.
Figure 3:
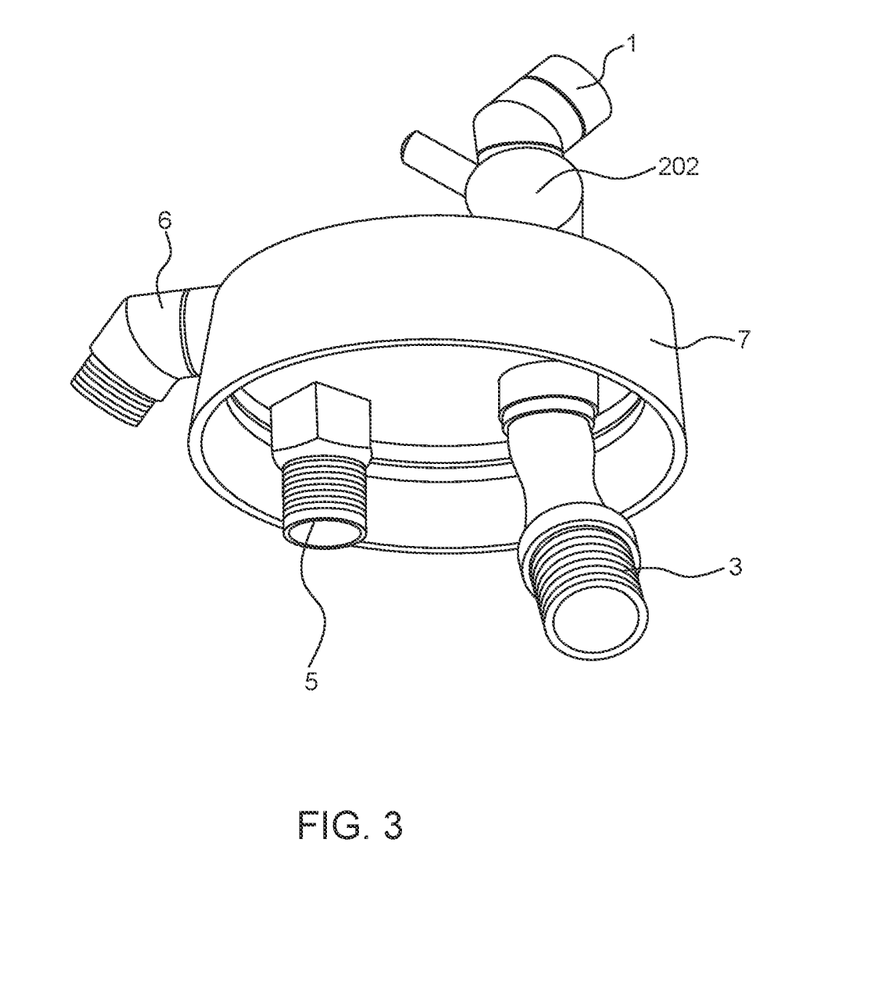
FIG. 3 is a bottom isometric view thereof.
Figure 4:
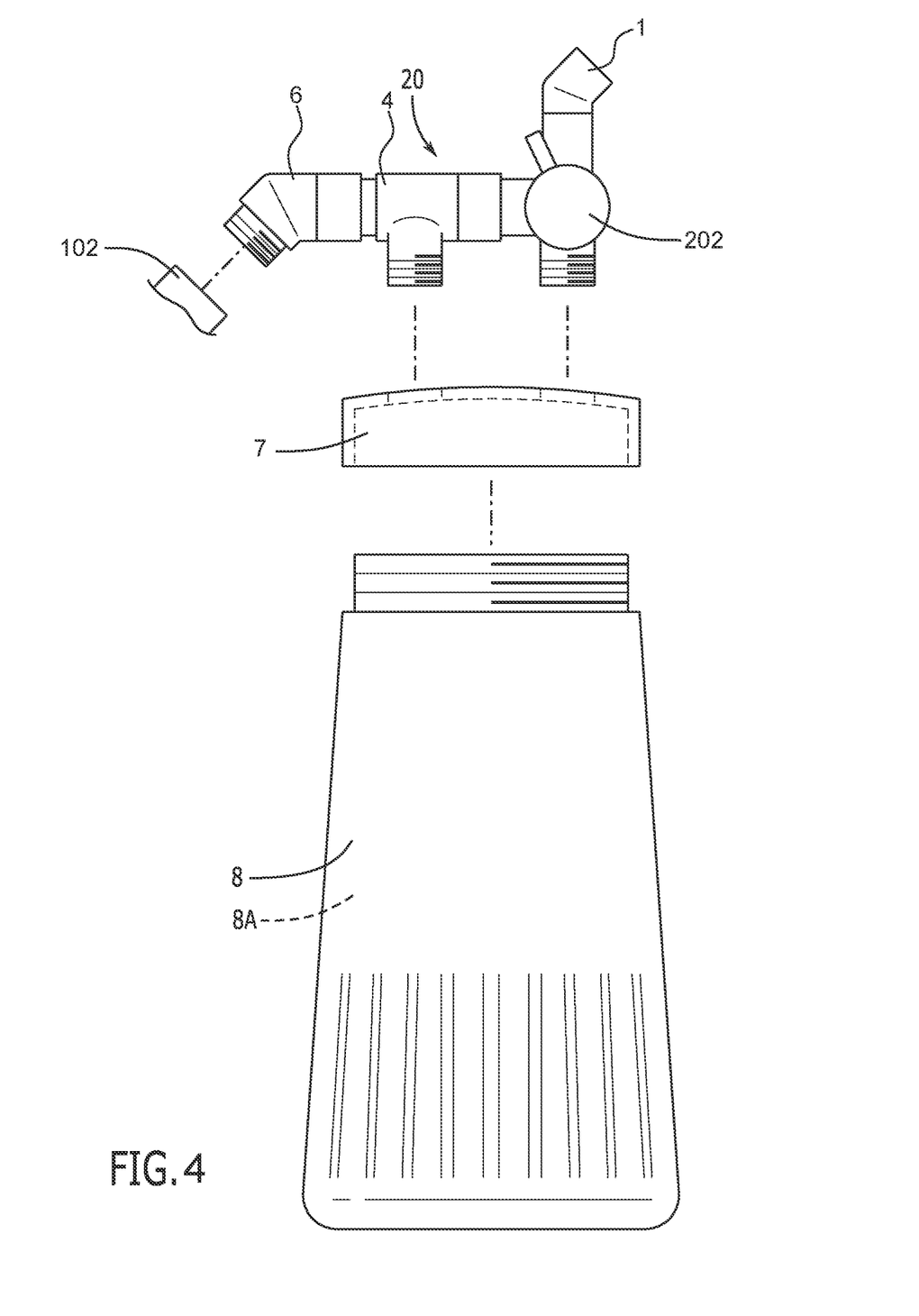
FIG. 4 is an exploded view thereof.
Figure 5:
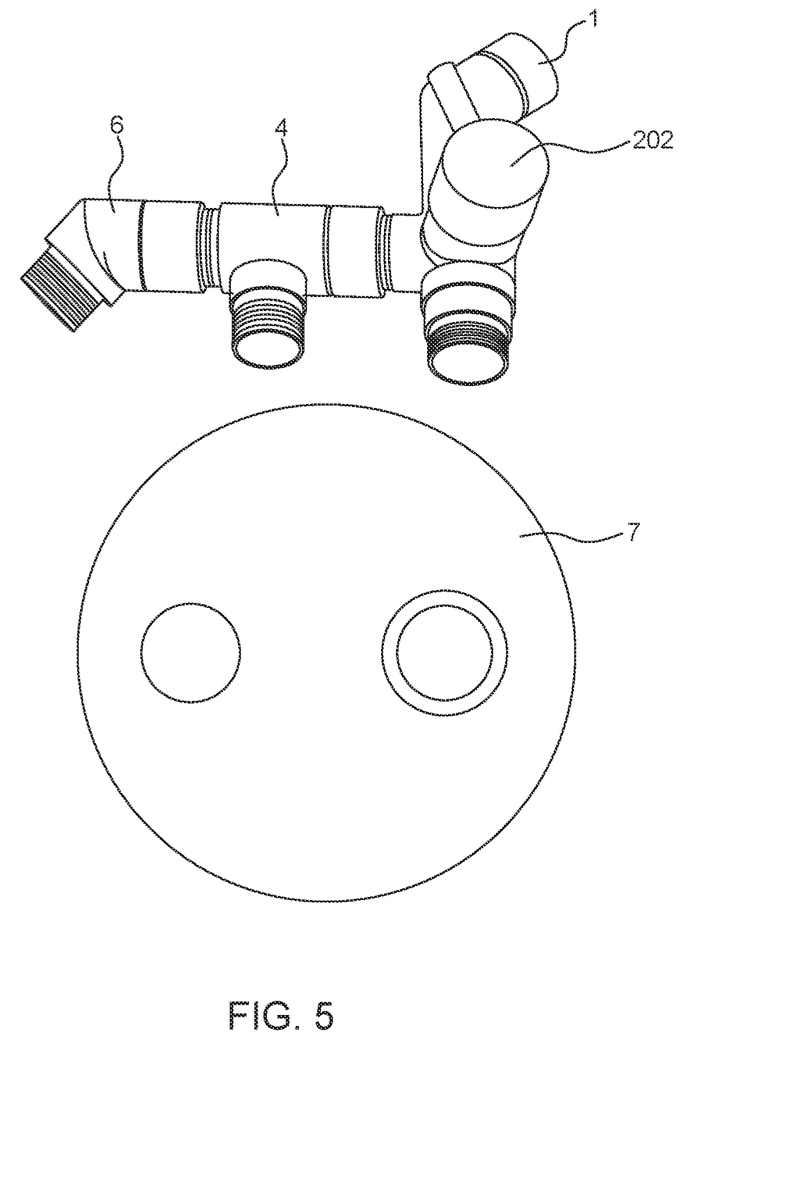
FIG. 5 is a partial exploded view thereof.
Figure 6:
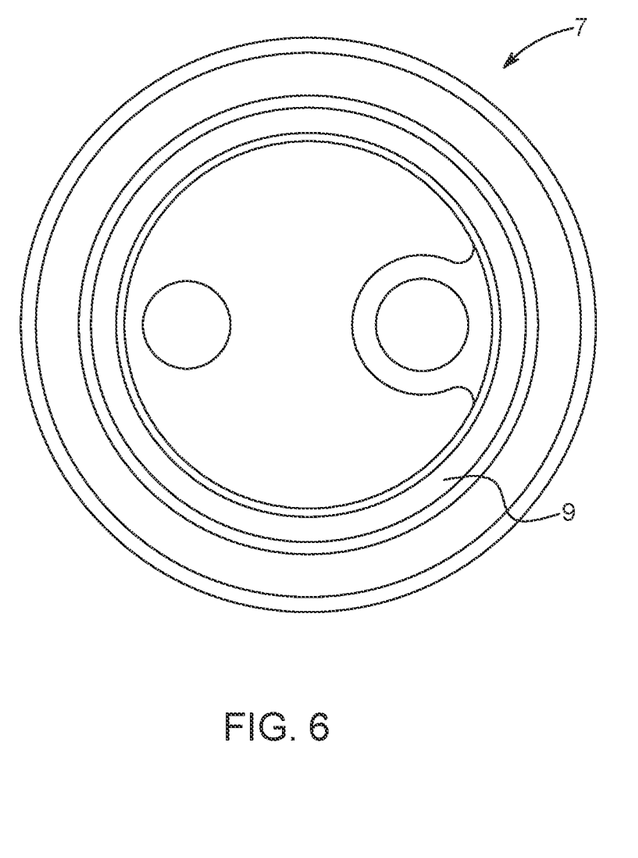
FIG. 6 is a bottom plan view of a cap thereof.

FIG. 1 depicts an example showerhead system 100 (or system 100) connected to a showerhead 102, in accordance with embodiments of the invention. FIG. 1 will be described in conjunction with FIGS. 2, 3, 4 and 5. FIGS. 2 and 3 depict top and bottom isometric views of the system 100, respectively. FIG. 4 depicts a disassembled view of the system 100, and FIG. 5 depicts a bottom view of a cap 7 of the system 100.

The system 100 may include a plurality of units including, but not limited to, a first connector 1, a second connector 6, a third connector 2, a fourth connector 4, an ice chamber 8, a valve 202 (see FIG. 2), and/or the like. The first connector 1 may be a two sided connector configured to receive water from an inlet water source or household water feedline. In an exemplary aspect, the first connector 1 may be an about 0.5 inch thin walled cylinder with an about 135 degree bend. The first connector 1 may be made of metallic structural material. The first connector 1 may have about 0.5 inch female threads that enable connection with the existing household water feedline, and the opposite end of the first connector 1 may have about 0.5 inch plumbing male threads.

The third connector 2 may be an about 0.5 inch 3-way metallic plumbing diverter. The valve 202 may be part of the third connector 2. In an exemplary aspect, the third connector 2 may include dual female connections/threads on the lateral side and bottom of the "T" shape, and male threads on the opposite lateral side of the "T" shape. The valve 202 may be a "T" shaped ball valve with a lever handle that diverts water linearly across the "T" shape or from one female thread on a lateral side to another female thread on a bottom of the "T" shape. In some aspects, the third connector 2 may be connected to the first connector 1, the ice chamber 8 (via other components described below) and the fourth connector 4.

The second connector 6 may be connected to the showerhead 102. The second connector 6 may be a two sided threaded connector. In an exemplary aspect, the second connector 6 may be an about 0.5 inch thin walled cylinder with an about 135 degree bend. The second connector 6 may be made of metallic structural material. The second connector 6 may include about 0.5 inch female threads that may enable connection of the second connector 6 to the showerhead 102, and the other end of the second connector 6 may include about 0.5 inch plumbing male threads.

The fourth connector 4 may be connected to the second connector 6 and the third connector 2. In an exemplary aspect, the fourth connector 4 may be a 3-way plumbing diverter with about 0.5 inch male threads on all outlets of the "T" shape. In some embodiments, the fourth connector 4 may be part of a two-sided threaded connection 20.

The ice chamber 8 may be configured to store ice or an ice pack 8A. In an exemplary aspect, the ice chamber 8 may be made of plastic, and may have thin walled cylindrical shape with an outer diameter of about 4.24 inches, a wall thickness of about 0.24 inches, and a height of about 12 inches. The ice chamber 8 may have an end face of about 0.24 inch thickness and may be open from the opposite end. The open end of the ice chamber 8 may include an about 0.125 inch deep, one full rotation, outer male thread. In an exemplary aspect, the ice chamber 8 may receive water from the first connector 1 via the third connector 2 when the valve 202 enables a flow of water into the ice chamber 8, as described later in the description below.

The system 100 may further include a linear directing plumbing component 3 (or component 3; see FIG. 3). The component 3 may be shaped as a cylinder with a length of about 1.5 inches. The component 3 may have female threads on one side and a smooth cylinder exit on the opposite side. The component 3 may be attached to the third connector 2 via the smooth cylinder exit side.

The system 100 may further include a metallic check valve 5 (see FIG. 3) that may have about 0.5 inch female threads. Water may be allowed to flow in one direction, i.e., towards the female threads (and not in the opposite direction).

Figure 8:
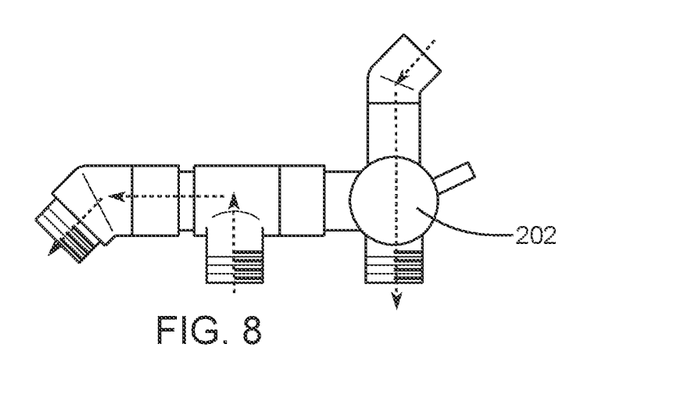
FIG. 8 is a schematic view of water flow through the system when the valve is in a first position.

During operation, the first connector 1 may receive water from an inlet water source. The valve 202 may be configured to move between a first position and a second position. The valve 202 may enable the flow of water from the first connector 1 into the ice chamber 8 when the valve 202 is in the first position. In this position, the second connector 6 may receive the flow of water via the fourth connector 4 from the ice chamber 8, and may transfer the water to the showerhead 102. In this manner, a user may receive cold water, i.e., having a temperature below that of locally available cold tap water, when the valve is in the first position. Specifically in this case, the third connector 2 may transfer water from the first connector 1 to the ice chamber 8, when the valve 202 is in the first position. See also FIG. 8, which illustrates the flow path of water when the valve 202 is in the first position.

Figure 7:
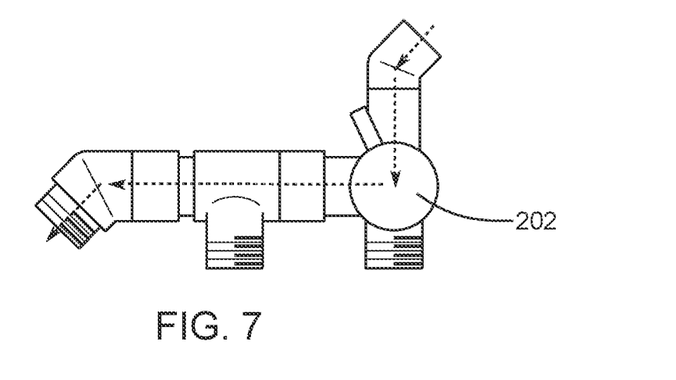
FIG. 7 is a schematic view of water flow through the system when the valve is in a second position.

The valve 202 may alternately enable the flow of water from the first connector 1 directly to the second connector 6 (and not via the ice chamber 8) when the valve 202 is in the second position. Specifically in this case, the third connector 2 may transfer water from the first connector 1 to the fourth connector 4 when the valve 202 is in the second position. The fourth connector 4 may then transfer water to the second connector 6, and hence to the showerhead 102. In this manner, the user may receive water at ambient temperature or a preset temperature and not water at a temperature colder than ambient (e.g., when the user does not want cold water), as the water is directly received from the first connector 1 and not via the ice chamber 8. See also FIG. 7, which illustrates the flow path of water when the valve 202 is in the second position.

In some aspects, the system 100 may further include a circular cap 7 (see FIG. 2) that may be connected to the third connector 2 and the fourth connector 4. The cap 7 may have a diameter of about 4.5 inches, and may be made of plastic or composite material. The cap 7 may have an about 1.5 inch tall thin exterior wall that extends perpendicularly to the circular face with a radial thickness of about 0.25 inches. The exterior wall of the cap 7 may be about 0.125 inch deep, with one full rotation inner female thread ("attachment mechanism"). The cap 7 may have an about 0.25 inch tall extruded wall perpendicular to the circular face with about 0.25 inch radial thickness and about 0.25 inch radial distance from the exterior wall. The cap 7 may further include two about 0.875 inch diameter holes (as shown in FIG. 4) cut through the circular face located about 2.125 inches from centers along a single diametric line and whose centers are equidistant from the center of the cap circular face. The cap 7 may be removably coupled to the ice chamber 8 by any suitable mechanism known in the art. In some aspects, the ice chamber 8 may be attached to the cap 7 via an inner female thread ("attachment mechanism").

The system 100 may additionally include a silicone gasket ring 9 disposed in an interior surface of the cap 7 to create a watertight seal (see FIG. 5). The ring 9 have an about 4-inch diameter with a cross sectional diameter of about 0.25 inches.

To assemble the system components described above, the male thread of the first connector 1 may be attached to the lateral end female thread on the third connector 2. The bottom female thread of the third connector 2 may be attached to the lateral side male thread of the fourth connector 4. The opposite lateral male thread of the fourth connector 4 may be attached to the female thread of the second connector 6. The lateral male thread of the third connector 2 and the bottom male thread of the fourth connector 4 may be aligned with and fed through the two through holes of the cap 7. The female thread of the component 3 may then be screwed into the lateral male thread of the third connector 2. The female thread of the metallic check valve 5 may then be screwed into the bottom male thread of the fourth connector 4. The silicone gasket ring 9 may then be placed and secured in between the outer exterior wall and the inner about 0.25 inch tall and about 0.25 inch thick radial wall of the cap 7. The female thread of the first connector 1 may then be screwed into a household shower feed line 12.

A typical shower head (e.g., the showerhead 102) may then be screwed onto the male thread of the second connector 6. The ice chamber 8 exterior thread on the open end may then be screwed into the interior threads of the cap 7 to create a watertight seal with the silicone gasket ring 9.

During operation of the system 100, if the valve 202 component of the third connector 2 directs water linearly (i.e., at 180°), water may enter the ice chamber 8, then pass through the metallic check valve 5 and the fourth connector 4 to exit the system 100 via the second connector 6 (and into the showerhead 102). If the valve 202 directs water at an about 90 degree angle, the water will bypass the ice chamber 8, be directed through the fourth connector 4, and exit the system 100 via the second connector 6 (and into the showerhead 102).

The dimensions of the components of the system 100 described above are exemplary in nature and should not be construed as limiting.

In some aspects, the system 100 may also be inline and may be manufactured without bends or with reduced bends. The inline system may be placed in a wall and installed by a plumber. In this case, the ice chamber may be accessible via a gasketed door. The inline system may support more weight and thus a bigger ice pack/cold sink, as well as allow for greater heat transfer.

To use the system 100, a user may attach the system 100 via the open female thread to user's water feed line with plumbers tape. The user may then attach the system 100 via the open male thread to the showerhead 102 with plumbers tape. The user may then place ice or a cold sink inside the ice chamber 8 and screw the ice chamber 8 onto the cap assembly. The user may then turn on the shower water and position the valve 202 to pass water through the ice chamber 8 in order to have colder shower water.

As the water flows through the system 100 towards the exit pipe, thermal energy may be passed from the water to the content of the ice chamber 8. Therefore, the water is cooler as it exits. The user may also choose to bypass the ice chamber 8 by actuating the valve 202 in order to take a warm shower first, without disrupting the ice or alternative cold sink material. Once a cold shower is desired, the valve 202 may be returned to its original (180°) position to force the water through the ice chamber 8 and activate the heat transfer properties of the ice chamber 8.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A showerhead system comprising:
    a first connector configured to receive water from an inlet water source;
    an ice chamber configured to receive water from the first connector, wherein the ice chamber is configured to store ice;
    a second connector configured to connect to a showerhead; and
    a valve configured to move between a first position and a second position, wherein the valve enables a flow of water from the first connector into the ice chamber when the valve is in the first position, and wherein the valve enables the flow of water from the first connector directly to the second connector when the valve is in the second position.

2. The showerhead system of claim 1, wherein the second connector is configured to receive the flow of water via the ice chamber when the valve is in the first position.

3. The showerhead system of claim 1 further comprising a third connector and a fourth connector, wherein the third connector is connected to the first connector, the ice chamber and the fourth connector, and wherein the fourth connector is connected to the second connector.

4. The showerhead system of claim 3, wherein the valve is part of the third connector.

5. The showerhead system of claim 3, wherein the third connector is configured to transfer water from the first connector to the ice chamber when the valve is in the first position and to the fourth connector when the valve is in the second position, and wherein the fourth connector is configured to transfer water from the first connector to the second connector.

6. The showerhead system of claim 3 further comprising a cap, wherein the cap is connected to the third connector and the fourth connector.

7. The showerhead system of claim 6, wherein the cap comprises an attachment mechanism, and wherein the ice chamber is attached to the cap via the attachment mechanism.

8. A showerhead system comprising:
    a first connector configured to receive water from an inlet water source;
    an ice chamber configured to receive water from the first connector, wherein the ice chamber is configured to store ice;
    a second connector configured to connect to a showerhead;
    a valve configured to move between a first position and a second position, wherein the valve enables a flow of water from the first connector into the ice chamber when the valve is in the first position, and wherein the valve enables the flow of water from the first connector directly to the second connector when the valve is in the second position; and
    a third connector and a fourth connector, wherein:
        the third connector is connected to the first connector, the ice chamber and the fourth connector, the fourth connector is connected to the second connector, and the valve is part of the third connector.

9. The showerhead system of claim 8, wherein the second connector is configured to receive the flow of water via the ice chamber when the valve is in the first position.

10. The showerhead system of claim 8, wherein the third connector is configured to transfer water from the first connector to the ice chamber when the valve is in the first position and to the fourth connector when the valve is in the second position, and wherein the fourth connector is configured to transfer water from the first connector to the second connector.

\* \* \* \* \*